Dec. 27, 1960   R. R. TEETOR   2,966,224
AUTOMOTIVE SPEED CONTROL DEVICE
Filed March 26, 1957   5 Sheets-Sheet 1

INVENTOR.
Ralph R. Teetor,
BY Davis, Lindsey, Hibben & Noyes
Atty's.

Dec. 27, 1960  R. R. TEETOR  2,966,224
AUTOMOTIVE SPEED CONTROL DEVICE
Filed March 26, 1957  5 Sheets-Sheet 2

INVENTOR.
Ralph R. Teetor,
BY
Davis, Lindsey, Hibben & Noyes
Attys.

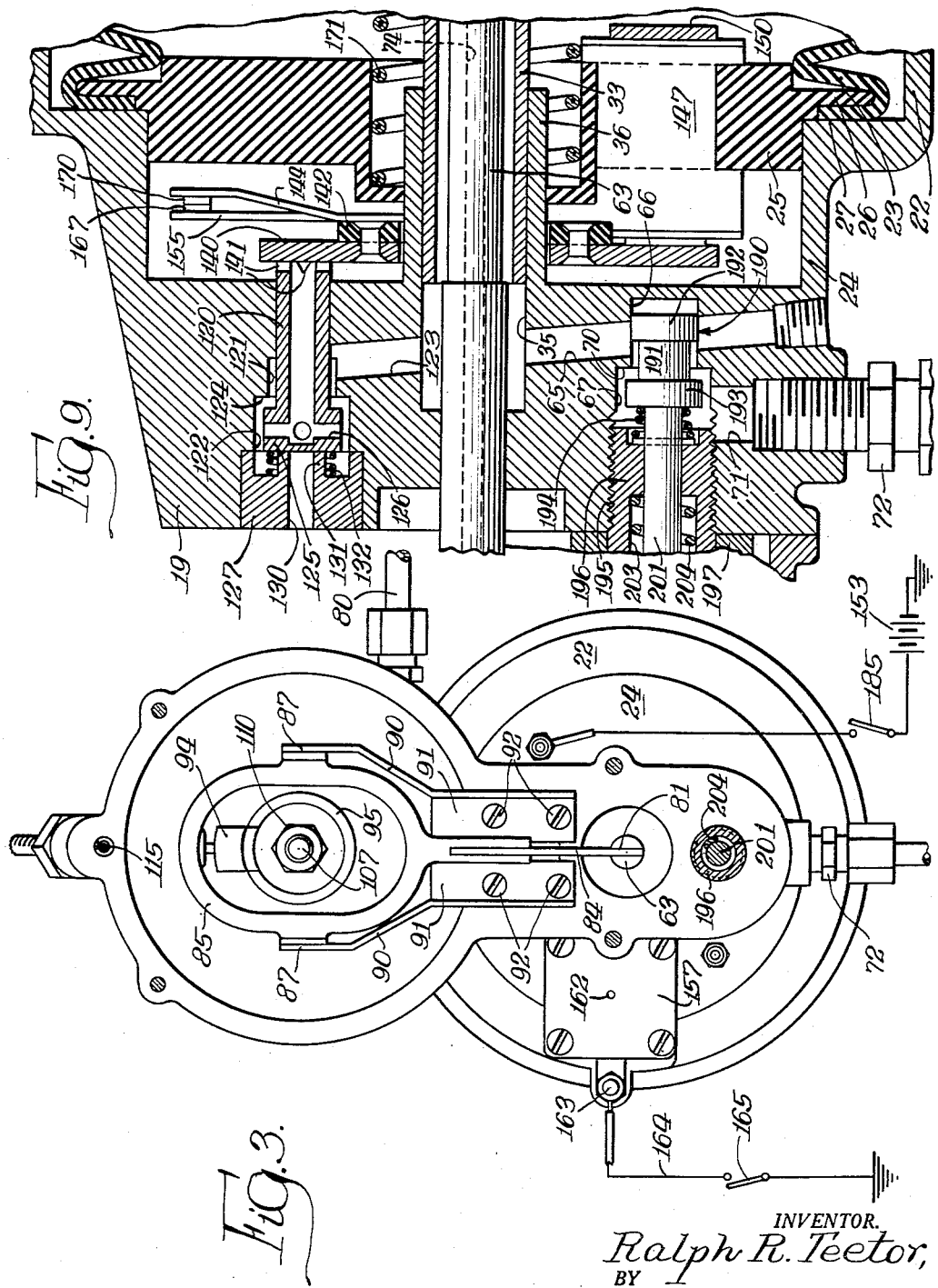

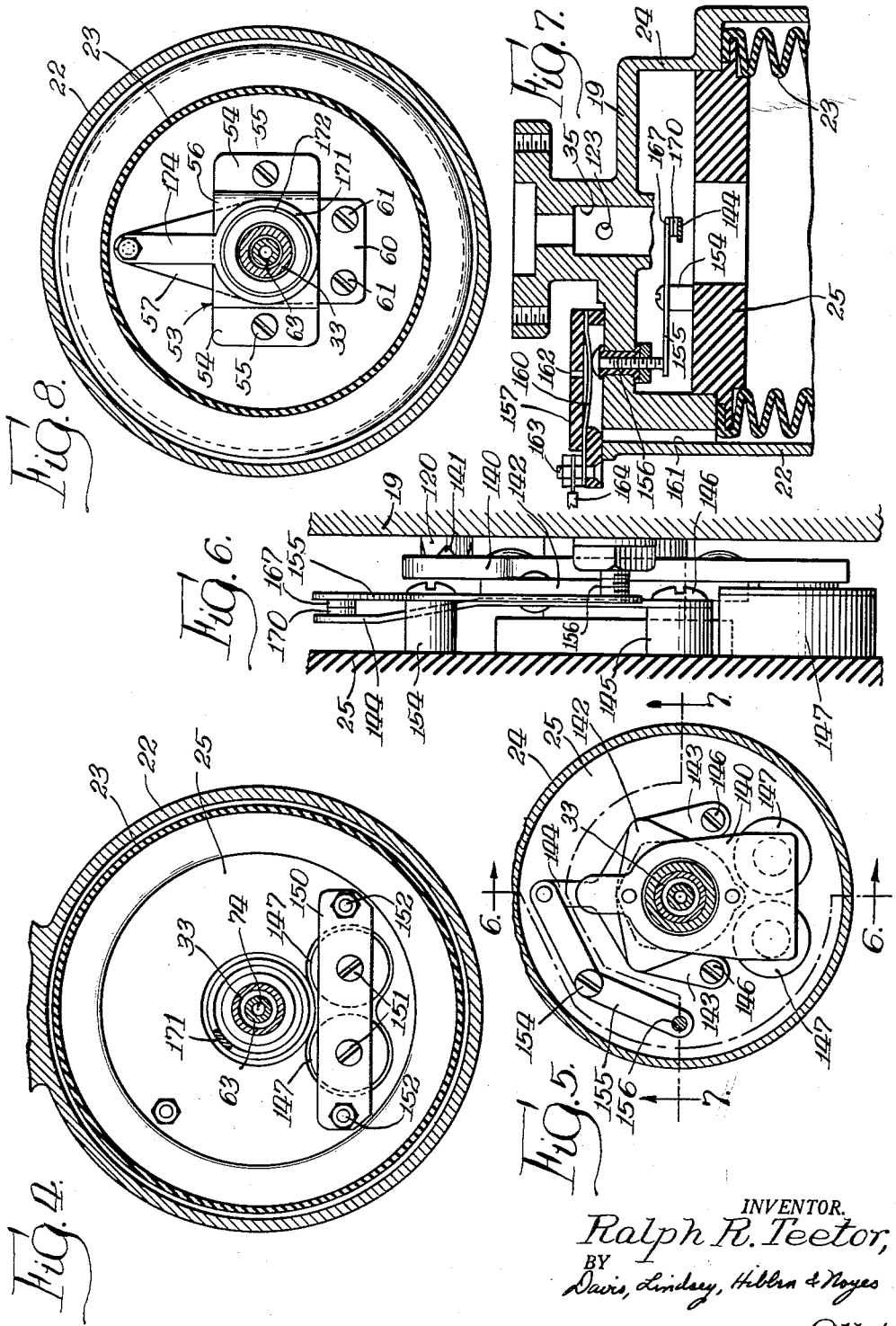

Dec. 27, 1960    R. R. TEETOR    2,966,224
AUTOMOTIVE SPEED CONTROL DEVICE
Filed March 26, 1957    5 Sheets-Sheet 5
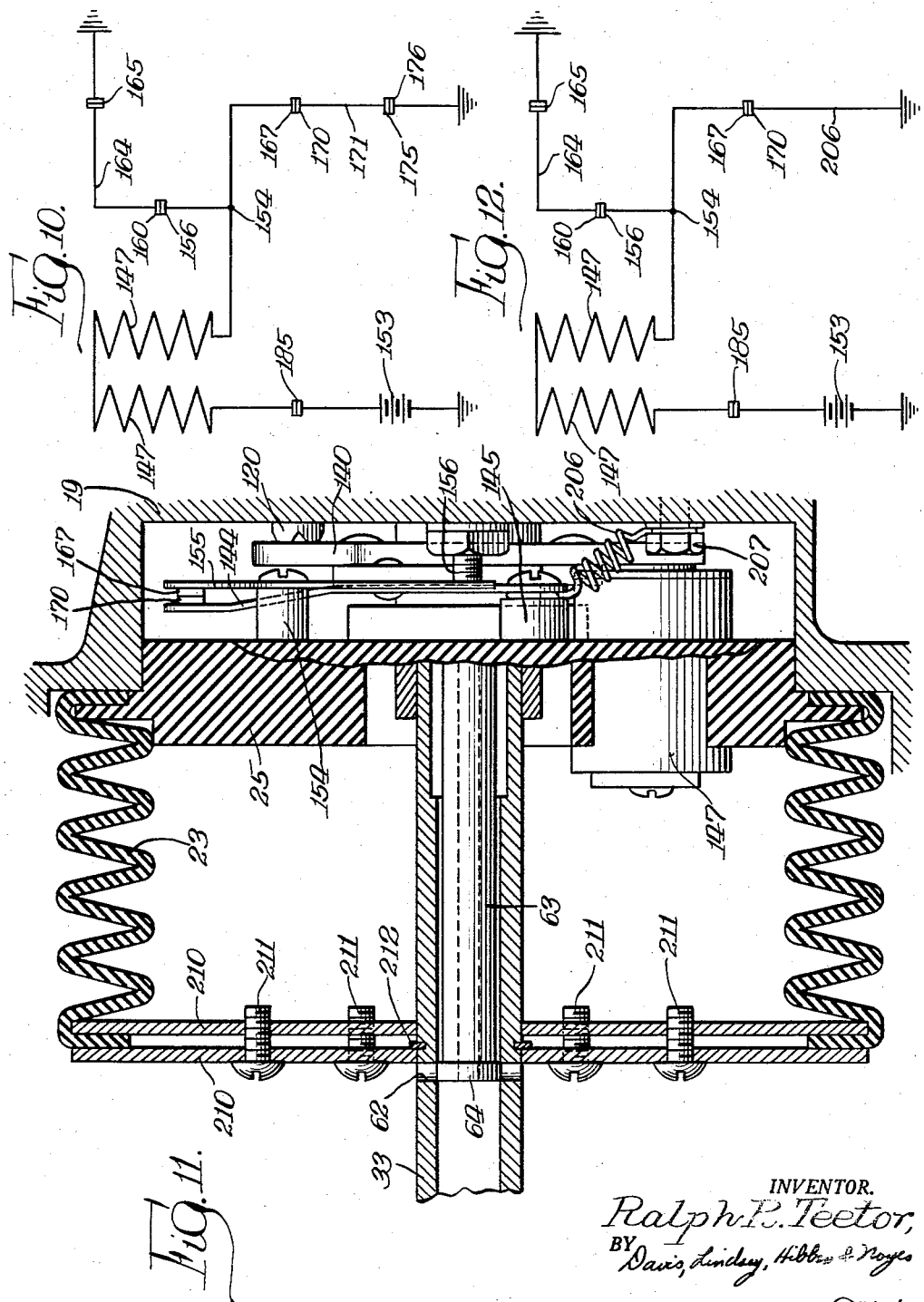
INVENTOR.
Ralph R. Teetor,
BY Davis, Lindsey, Hibben & Noyes
Attys.

United States Patent Office 2,966,224
Patented Dec. 27, 1960

2,966,224

AUTOMOTIVE SPEED CONTROL DEVICE

Ralph R. Teetor, Hagerstown, Ind., assignor to Perfect Circle Corporation, Hagerstown, Ind., a corporation of Indiana Filed Mar. 26, 1957, Ser. No. 648,701

37 Claims. (Cl. 180—82.1)

The invention relates generally to speed control devices and more particularly to a device for assisting an automobile driver to maintain operation of a vehicle at a desired speed.

In my Patent No. 2,519,859, issued August 22, 1950, there is disclosed a device of this general character, which indicates to the driver, through a resistance to depression of the throttle control member or accelerator pedal, that a predetermined speed of the vehicle has been reached, the device, however, permitting movement of the accelerator pedal beyond the point at which such resistance occurs, so that such predetermined speed may be exceeded when there is need for doing so. The device shown in said patent provides for adjustment by the driver of the speed at which such resistance so that it can be suited to the proper speed for any given road condition or speed limit.

In my copending application Serial No. 436,529, filed June 14, 1954 and now Patent No. 2,916,100, there is shown a speed control device having the features of the device shown in said patent and also the feature of holding the vehicle at a predetermined speed by holding the accelerator at such position as to produce such speed so that the driver may remove his foot from the accelerator pedal and the vehicle will continue to run at such speed. With this device, the position of the accelerator pedal will be varied slightly during operation with variations in road resistance so that a constant vehicle speed will be maintained. The device is so constructed that the holding means may be disabled by slight depression by the driver of either the accelerator or the brake pedal so that the vehicle may be quickly returned to normal operation under full control of the driver.

The general object of the present invention is to provide a speed control device having the features of the device disclosed in my copending application but of novel construction, by which manufacture of the device is facilitated and the cost thereof reduced, and which operates easily with a minimum of attention.

Another object is to provide a novel speed control device of the foregoing character, which utilizes vacuum from the intake manifold of the engine of the vehicle as the actuating medium, and which is provided with means for preventing sudden decreases in the vacuum in the intake manifold from affecting the operation of the device.

A further object is to provide a novel speed control device which may be manually set so that it is completely disabled, and the vehicle may be operated in the same manner that it would be if it were not provided with such a device.

Other objects and advantages will become apparent from the following description taken in connection with the accompanying drawings, in which:

Fig. 3 is a plan view of the upper end of the device with certain cover portions removed, and taken along the line 3—3 of Fig. 2;

Fig. 4 is a fragmentary sectional view taken on the line 4—4 of Fig. 2;

Fig. 5 is a fragmentary sectional view taken on the line 5—5 of Fig. 2;

Fig. 6 is an enlarged fragmentary sectional view taken on the line 6—6 of Fig. 5;

Fig. 7 is a fragmentary sectional view taken on the line 7—7 of Fig. 5;

Fig. 8 is a fragmentary sectional view taken on the line 8—8 of Fig. 2;

Fig. 9 is an enlarged view of a portion of Fig. 2;

Fig. 10 is a diagrammatic view of the electrical circuits utilized in the device;

Fig. 11 is a longitudinal sectional view showing a portion of a modified form of the speed control device; and Fig. 12 is a digrammatic view of the electrical circuits utilized in the modified form of device shown in Fig. 11.

Figure 1:
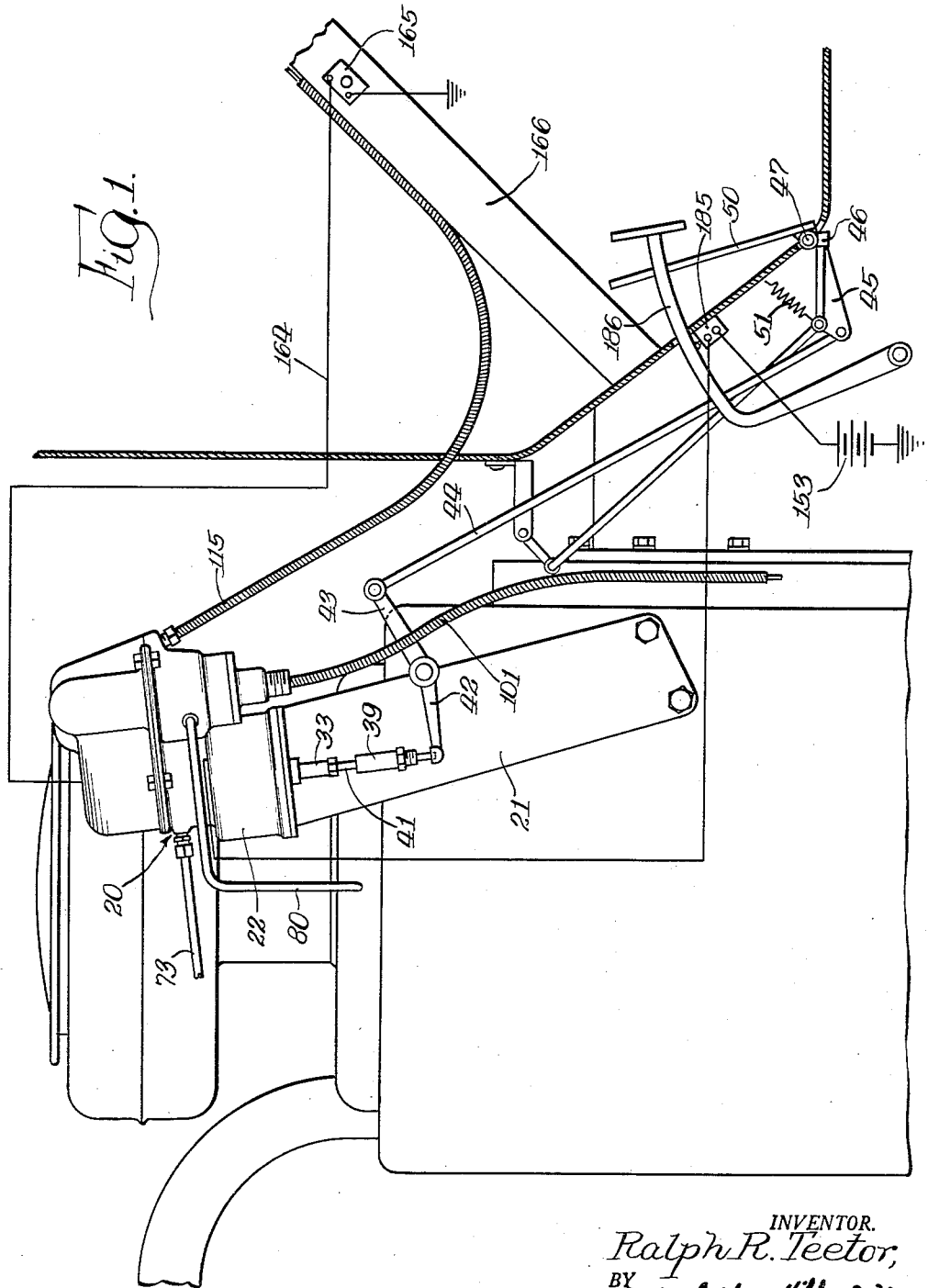
Fig. 1 is a fragmentary longitudinal sectional view of an automotive vehicle provided with a speed control device embodying the features of the invention.

The speed control device shown herein involves the same general principles of operation as are utilized in the device shown in my prior patent and in the said copending application. The present embodiment, however, is of novel construction facilitating manufacture of the device and also reducing the cost of such manufacture.

In both forms of the speed control devices shown in my prior patent and my copending application, a fluid pressure actuating means is provided for offering a resistance to depression or advancing movement of the accelerator pedal when the vehicle is operating at a predetermined speed. While the device may be operated with any of the various pressure fluids in an automotive vehicle, the devices of my prior patent and of my copending application as well as the device herein disclosed are shown as being operated by vacuum which is available in the intake manifold of the engine of the vehicle. When the term "pressure fluid" is referred to in the claims, it is intended that such expression is broad enough to cover any of the pressure fluids available in a vehicle of this character and to include vacuum.

A device of the character herein contemplated comprises generally means movable with the accelerator pedal of the vehicle and carrying a pressure-responsive means which, when pressure fluid is applied thereto, offers a resistance to further movement of the accelerator pedal. In the embodiment illustrated herein, vacuum from the intake manifold of the engine is used and the resistance is such that the accelerator pedal may be depressed or advanced further if desired against the resistance. This is of advantage to the driver since there are times when it is advantageous, such as in passing another vehicle, to be able to exceed the speed for which the device is set.

The vacuum is applied to a fluid pressure means movable with the accelerator pedal and is under the control of two factors, namely, the extent of depression or advancing movement of the accelerator pedal and the speed of the vehicle. The admission of vacuum is rendered responsive to the speed of the vehicle by means of a governor having a drive connected to operate in timed relation with the vehicle speed. The governor operates a valve which cooperates with an opening in a means movable with the accelerator pedal to admit pressure fluid (vacuum in this instance) to the fluid pressure means to provide the resistance. The vehicle speed at which the vacuum is admitted to the fluid pressure means may be adjusted by adjusting a spring in the governor. The spring is preferably adjusted by a means mounted at a convenient point for the driver of the vehicle so that he can set it to obtain resistance to depression of the accelerator pedal at any vehicle speed he desires.

The device disclosed herein is similar to the device shown in my prior patent in operating in the manner just described. The present device is also similar to the speed control device disclosed in said copending application in that it is provided with means for holding the accelerator pedal at such a point that the vehicle will operate at a predetermined speed. On long drives, particularly in the country where a given speed may be maintained for a substantial distance, it is tiring to the driver to maintain pressure on the accelerator pedal in order to effect operation of the vehicle at the desired speed. The present device, as in the case of the device shown in my copending application, therefore includes a means for holding the accelerator at the predetermined speed for which the device is set so that the driver may remove his foot from the accelerator when the device is so set, to avoid becoming tired.

A positive locking means for holding the accelerator pedal in a predetermined position is undesirable from a number of aspects. Such a device requires a conscious effort on the part of the driver to release it and in an emergency this could cause disastrous results. Moreover, a driver might leave such a device in a locked condition when stopping and forget that fact when he started again so that the vehicle would tend to be accelerated too rapidly to the set speed. The present device avoids such difficulties by being constructed so that a slight depressing movement of either the accelerator pedal or the brake pedal of the vehicle immediately releases the holding means and thus quickly returns the vehicle to normal operation under full control of the driver. In an emergency, the driver instinctively depresses the brake pedal so that the holding means is thereby immediately disabled and the driver is not required to take some separate unusual action to release the holding means. Should the emergency call for an increase in speed, the depression of the accelerator pedal to produce such increase causes a release of the holding means. Thus, while the holding means is available when desired to avoid the tiring effect on the driver of holding the accelerator pedal, such holding means is immediately released when the driver takes any other action usually involved in changing his rate of travel.

In the present embodiment, the holding means is operated by fluid pressure and is the same means that is utilized to provide the resistance to depression of the accelerator pedal at the predetermined speed. The holding means is adapted to be rendered operable only when the driver takes certain steps to effect this result. The fluid pressure means used for providing resistance to the depression of the accelerator pedal and for holding the accelerator pedal at such position so as to produce a predetermined speed of the vehicle, is in the present instance in the form of a bellows. Vacuum is adapted to be applied to one side of the bellows for advancing the accelerator pedal and to thus move it to a point where the predetermined vehicle speed will be attained, and, under the control of the governor-operated means, vacuum is also applied to the opposite side of the bellows when the predetermined speed has been attained. Thus, the force tending to advance the accelerator pedal is counterbalanced by the force resisting the advancing movement of the accelerator pedal so that the latter will be held in the desired position. If the vehicle tends to exceed the set speed because of road conditions, such as going downhill, the spring which normally retracts the accelerator pedal and is part of the usual arrangement in the vehicle will retract the accelerator pedal until the vehicle is reduced in speed to that desired. Such spring will not retract the accelerator pedal below the point which produces the set vehicle speed because then the resistance to advancing movement under the control of the governor would be withdrawn and the action of the vacuum tending to advance the accelerator pedal would overcome the effect of the spring up to the point where such resistance to advancing movement again becomes effective.

If the road conditions tend to reduce the speed of the vehicle below the set speed, as when going uphill, resistance to advancing movement of the accelerator pedal immediately falls off because of the action of the governor, and the force of the vacuum tending to advance the accelerator pedal overcomes the spring sufficiently to advance the accelerator pedal to the point where the resistance is again effective. Thus, the present device, as in the case of the device shown in my copending application, is capable of maintaining the vehicle at a predetermined speed regardless of road conditions and by shifting the position of the accelerator pedal will compensate for variations in such conditions. However, the holding effect of the device may be completely disabled merely by slight depression of either the accelerator pedal or the brake pedal as mentioned above.

The present embodiment of the device, while having a construction which facilitates manufacture and renders it fully reliable with a minimum of attention, also has a number of features which provide advantages over the form shown in my copending application. Thus, in the present device, no vacuum can be applied to the fluid pressure means for advancing the accelerator pedal until the vacuum is applied oppositely to the fluid pressure means to resist advancing movement of the accelerator pedal. This necessitates having the driver of the vehicle bring the vehicle up to the desired speed before the holding means can be rendered operable and the driver therefore can be assured, before he renders the holding means operable, that the speed at which he intends to hold the vehicle is a safe speed for operation thereof. This avoids any danger of the vehicle being brought up to the set speed automatically when the vehicle is being driven at a lower speed.

The present device also includes means for preventing loss of vacuum acting on the fluid pressure means. In the operation of an ordinary internal combustion engine, there are times when the vacuum is very low and would not be sufficient to effect proper operation of the device. For instance, the vacuum in the intake manifold is very low mhen the engine is accelerated. For this reason, the passage in the device which is connected to the intake manifold for supplying vacuum to the device is provided with a check valve which immediately closes when the vacuum in the intake manifold falls. Thus, the vacuum within the device remains substantially at the value it had before such valve closes.

The check valve is also utilized as a means for completely disabling the device. In order to vary the vehicle speed at which the device operates, adjusting means accessible to the driver is provided, by which the speed at which the device acts may be varied. When the device is adjusted to its minimum vehicle speed, the adjusting means also effects closing of the check valve so that no vacuum is available for operating the device. Thus, the device may be completely disabled and the vehicle may be operated in the same manner that it would be if it were not provided with such a device.

Figure 2:
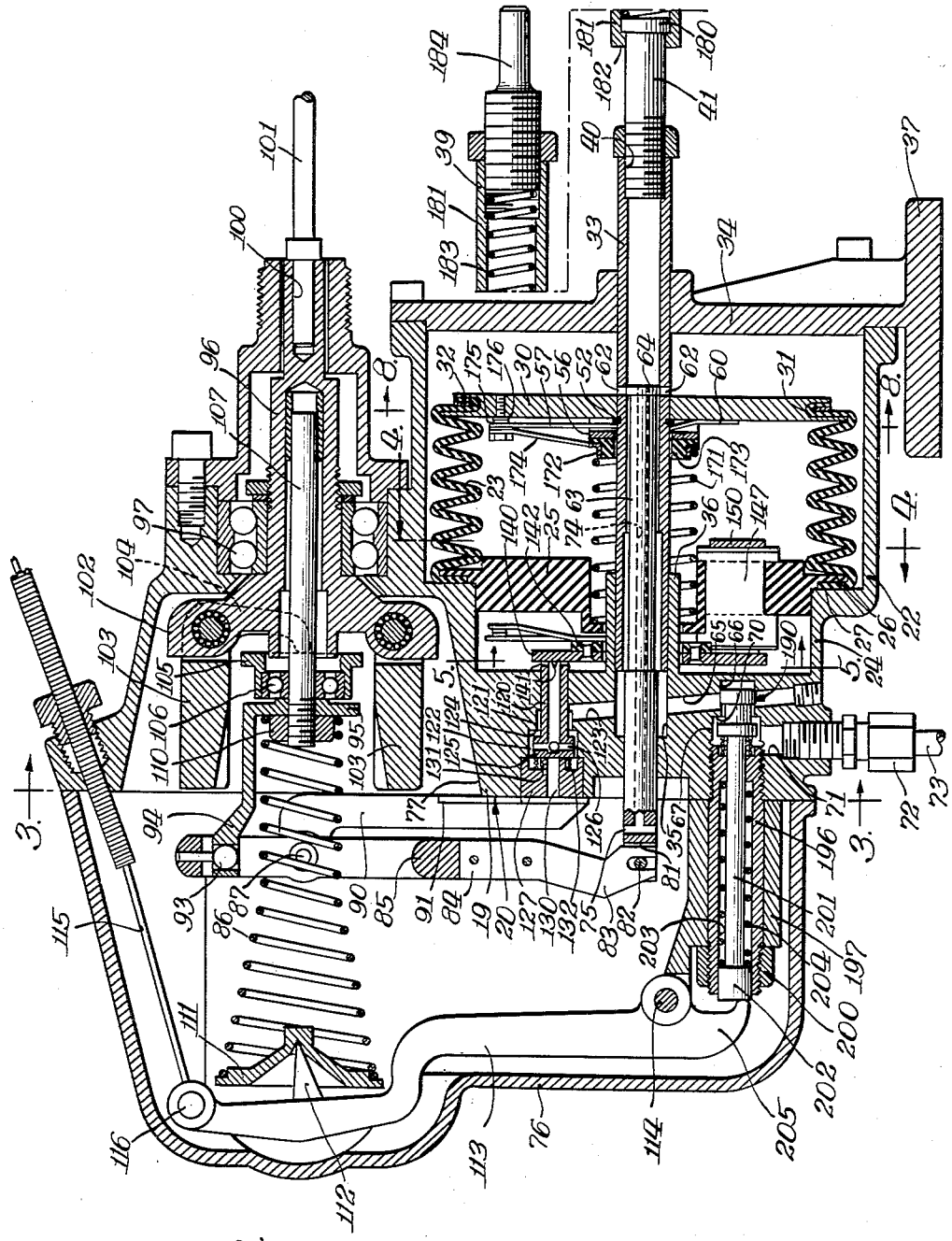
Fig. 2 is a longitudinal sectional view of the speed control device shown in Fig. 1.

As shown in Figs. 1 and 2 of the drawings, the present device comprises a housing, indicated generally at 20, adapted to be mounted on a bracket 21 secured in some convenient place under the hood of the vehicle. The housing 20 includes a cylindrical portion 22 in which is mounted a fluid pressure actuated means comprising in this instance a bellows 23. As shown in Figs. 2 and 9, the cylindrical portion 22 of the housing has a reduced left end, indicated at 24, closed by a thickened end wall 19. Mounted in the reduced portion 24 is a support 25 made of insulating material and having a flange 26 clamping the left end of the bellows 23 against a shoulder 27 formed by the reduced portion 24 of the housing. The right-hand end of the bellows 23 is secured to an end member or plate 30 in an air-tight manner. In the present instance, the plate 30 is shown as having a groove 31 in its periphery, and the end portion of the bellows is folded upon itself and inserted in the groove and held in place by a spring ring 32. The spring ring 32 is in the form of a washer-like element which tends to contract and is provided with a radial gap so that it may be sprung open enough to be inserted between the two sides of the fold of the bellows. Because of its tendency to contract, it holds the folded portion of the bellows in the notch 31 in tight engagement therewith.

The end plate 30 is slidably mounted on a tubular rod 33. The rod 33 extends from the exterior of the cylinder portion 22 of the housing to the interior thereof and is supported adjacent its right end by a coverplate 34 secured to the cylinder portion 22. At its left end, the rod extends into a cavity 35 formed in the end wall 19 of the housing, and the rod is guided by a cylindrical sleeve 36 extending from the end wall 19 within the reduced portion 24. The housing 20 is supported by the coverplate 34 which has an attaching portion 37 adapted to be secured to the bracket 21. The coverplate 34 is detachably secured to the cylinder portion 22 of the housing as by screws and may be secured to such cylindrical portion in different positions rotatably so that the device can be readily mounted in different makes of vehicles where the various items of equipment under the hood are mounted in different manners.

The rod 33 is adapted to be actuated by the accelerator pedal of the vehicle and to this end, the outer end of the rod is shown as being threaded at 40 to receive a link 41. The latter is adapted to be connected to the accelerator pedal through a yielding telescopic joint 39 hereinafter described. The exact mounting of the device and the position of the accelerator pedal will differ in different makes of vehicles and consequently the connection between the link 41 and the accelerator pedal will differ. As an example, I have shown in Fig. 1 a bell crank having one arm 42 secured to the end of the joint 39. The other end of the bell crank, indicated at 43, is secured to a rod 44 connected to a bracket 45, and the latter is here shown as attached to a lever 46 pivotally mounted on the floor of the vehicle at 47 and constituting a portion of the linkage connecting the accelerator pedal with the carburetor control. The pivot 47 also supports the accelerator pedal, shown at 50. With such linkage, it is obvious that depression or advancing movement of the accelerator pedal 50 will result in movement of the rod 33 inwardly of the cylindrical portion 22 of the housing. A spring 51 is usually provided in such linkage, tending to retract the accelerator pedal. Thus, the spring 51 always tends to move the linkage connected to the rod 33 to shift the rod towards its extreme right-hand position as shown in Fig. 2.

The end plate 30 is mounted on the rod 33 and is generally movable therewith but is arranged for limited movement relative to the rod 33 for purposes to be hereinafter described. Thus, the rod 33 is provided with a snap ring 52 positioned at the interior side of the end plate 30 within the bellows 23, and a bridge member, indicated generally at 53, is mounted on the inner side of the end plate 30. The bridge member comprises end portions 54 (see Figs. 2 and 8) rigidly secured to the inner face of the end plate 30 as by screws 55, and an intermediate offset portion 56 in spaced relation to the inner face of the end plate 30. Extending between the offset portion 56 and the inner face of the end plate 30 is a spring 57 whose function will be hereinafter described. The spring member 57 has a lower end portion 60 secured to the inner face of the end plate 30 as by screws 61.

When the accelerator pedal 50 is advanced to increase the speed of operation of the vehicle, the snap ring 52 moves away from the inner face of the end plate 30 and engages the spring 57, forcing it against the offset portion 56 of the bridge member 53 and thus moves the end plate toward the left, as shown in Fig. 2, with the rod 33. When the driver removes his foot from the accelerator pedal, the spring 51 tends to return the parts to their idle position, and the snap ring 52 engages the inner face of the end plate 30 to move the end plate toward the right as shown in Fig. 2.

As mentioned above, the device includes a means providing a resistance to depression or advancing movement of the accelerator pedal when the vehicle reaches a predetermined speed. While any fluid under pressure generally utilized in the vehicle may be used for this purpose, in the present instance the vacuum in the intake manifold of the engine of the vehicle provides the necessary force for offering such resistance. To this end, the rod 33 is tubular in form and is provided with radial openings 62 (see Fig. 2) adjacent the outer face of the end plate 30. Mounted within the rod 33 is a valve rod 63 which is of smaller diameter than the interior of the rod 33 and is provided with a head 64 on its inner end which fits snugly within the tubular rod 33. The space between the valve rod 63 and the interior of the rod 33 communicates with the cavity 35 in the end wall 19 of the casing 20, and such cavity 35 in the present instance is connected with the intake manifold. Thus, the end wall 19 of the housing 20 is provided with a passage 65 (see Fig. 9) extending from the cavity 35 to a valve chamber 66. The valve chamber 66 is provided with an enlarged portion 67 forming a shoulder 70 therein. The enlarged portion 67 of the valve chamber communicates with a passage 71 adapted to receive a fitting 72 having a tube 73 connected thereto and to the intake manifold of the engine. Thus, when the engine is operating, vacuum is applied to the cavity 35 and to the space between the valve rod 63 and the interior of the rod 33.

With the foregoing structure, when the head 64 of the valve within the rod 33 is moved to the right (as shown in Fig. 2) of the radial opening 62, vacuum will be applied to the right end of the cylindrical portion 22 of the housing and thus will be applied to the exterior of the bellows and to the exterior face of the end plate 30. When the head 64 of the valve is moved to the left of the radial openings 62 in the rod 33, the radial openings 62 then communicate with the interior of the right-hand end of the rod 33, and the latter is adapted to be connected to atmosphere so that at such time atmospheric pressure will exist in the right-hand end of the cylindrical portion 22.

To connect the right end of the rod 33 with the atmosphere, the valve rod 63 is provided with a longitudinally extending bore 74 throughout the major portion of its length from the head 64 to adjacent the opposite end of the valve rod. The valve rod 63 extends beyond the end wall 19 of the housing 20 and the outer end of the valve rod is provided with a radial passage 75. The left end of the housing 20 is enclosed by a cover 76 and the space therein is maintained at atmospheric pressure. Thus, when the valve member 64 moves to the left of the radial opening 62, air at atmospheric pressure will be admitted through the radial passage 75 in the valve rod, the longitudinal bore 74, the right-hand end of the rod 33 and the radial openings 62 to the right-hand end of the cylindrical portion 22 of the housing. To insure that the air entering the cylindrical portion 22 is clean, the interior of the cover 76 opens into a cavity 77 (see Fig. 2) in the housing 20, and the latter is adapted to be connected by a tube 80 (see Figs. 1 and 3) with the air cleaner of the engine so that any air that enters the cylindrical portion 22 of the housing will be free from dirt.

The application of vacuum to the right-hand end of the cylindrical portion 22 of the housing is adapted to be controlled both by the position of the accelerator pedal and by the speed of operation of the vehicle. Thus, the position of the openings 62 in the rod 33 is determined by the position of the accelerator pedal since the rod 33 is actuated by the accelerator pedal. The position of the valve head 64 is determined by a governor responsive to the speed of the vehicle. When vacuum is admitted through the radial openings 62 in the rod 33, it thus tends to draw the end plate 30 and the bellows 33 toward the right in the cylindrical portion 22 of the housing to offer a resistance to further advancing movement of the accelerator pedal.

To shift the valve member 64 in accordance with the vehicle speed, the left end of the valve rod 63 has a transverse slot 81 (see Figs. 2 and 3) provided with a cross pin 82. Extending into the slot 81 for engagement with the cross pin 82 is the forked end 83 of a lever 84 operated by the governor. The lever 84 has a yoke portion 85 extending about a governor spring 86. The yoke portion 85 is pivotally supported at its opposite sides at 87 by brackets 90 secured to the housing 20. Each bracket 90 is in the form of an arm extending from and bent at a right angle to a securing portion 91 secured flatwise against the outer face of the end wall 19 of the casing 20, as by screws 92. The yoke portion 85 of the lever 84 is provided with an inwardly extending ball connector 93 adapted to be mounted in the end of an arm 94 extending from a collar 95 adapted to be operated by the governor. The governor is responsive to the speed of the vehicle so that the valve rod 63 will be shifted through the lever 84 in accordance with variations in vehicle speed.

The governor in the present instance is mounted in a portion of the housing 20 and comprises a tubular shaft 96 supported in the housing by a bearing 97. The shaft 96 extends to the exterior of the housing and is provided with a socket 100 to receive the end of a flexible shaft 101. The flexible shaft 101 is adapted to be driven in timed relation with the speed of the vehicle and for this purpose it is preferably connected to the speedometer drive cable (not shown) of the vehicle. The shaft 96 at its inner end is provided with a head 102 located in the cavity 77 of the housing 20, on which a pair of centrifugal weights 103 are pivotally mounted eccentrically of the shaft. Each centrifugal weight 103 is provided with an inwardly extending arm 104 adapted to bear against a collar 105. The collar 105 is supported by a bearing 106, the inner race of which is rigidly mounted on a plunger 107 extending into the shaft 96 and journalled at its inner end therein. The plunger 107 is adapted to have the collar 95 secured thereto and for this purpose the collar 95 is clamped between the inner race of the bearing 106 and a nut 110 threaded on the end of the plunger 107. Longitudinal movement of the plunger 107 by the outward movement of the centrifugal weights 103 is opposed by the spring 86 which in this instance is shown as being a trumpet-shaped spring.

With this governor, an increase in vehicle speed causes the weights 103 to swing outwardly, thus moving the plunger 107 toward the left, as illustrated in Fig. 2. Such movement of the plunger swings the lever 84 about its pivots 87 to move the valve head 64 on the valve rod 63 to the right within the rod 33. When the rod 33 has been moved sufficiently to the left by depression of the accelerator pedal and the valve head 64 has been moved to the right by increased speed of the vehicle so that the valve head 64 is to the right of the radial openings 62 in the rod 33, vacuum will be admitted to the right-hand end of the cylindrical portion 22 of the housing and will exert a force on the end plate 30 tending to move it toward the right. Such force is imparted to the rod 33 through the bridge member 53 bearing against the spring 57 and the latter against the snap ring 52 in the rod 33. Thus, a resistance is offered to further depression of the acelerator pedal by the vacuum applied to the outer or right-hand face of the end plate 30, and this occurs at a predetermined vehicle speed in response to the governor which is driven in timed relation with the vehicle speed and in response to the position of the accelerator pedal for producing such vehicle speed.

The governor is adjustable to vary the speed at which vacuum is admitted to the right-hand end of the cylindrical portion 22 of the housing. For this purpose, the spring 86 at its outer or upper end bears against a dished plate 111 carried on a conical point 112 formed on a lever 113. The lever is pivotally supported at 114 in the cover 76, and adjustment of the lever varies the pressure exerted by the spring 86 to determine the vehicle speed at which vacuum will be applied to the end plate 30 through the radial openings 62. To adjust the lever 113, a Bowden wire 115 is connected at 116 to the free end of the lever 113 and extends to a convenient place for operation by the driver of the vehicle, for example, along the steering post of the vehicle. The upper end of the Bowden wire is preferably located adjacent the steering wheel and is provided with manually adjustable means (not shown) which may be moved by the driver to adjust the pressure exerted by the spring 86.

The present device also includes means which is manually controlled for holding the accelerator pedal 50 at a point to produce a predetermined speed of the vehicle so that the driver can remove his foot from the accelerator pedal and the vehicle will continue to operate at such speed. Such speed is that at which resistance is offered to the depression of the accelerator pedal as determined by the setting of the Bowden wire 115.

The means for holding the accelerator pedal at a point to produce such predetermined speed is operated by pressure fluid, and in the present instance vacuum from the intake manifold of the engine is utilized and is applied to the bellows 23 and end plate 30 oppositely to the manner in which it is applied to provide resistance to advancing movement of the accelerator pedal. Thus, in the present instance, vacuum is applied to the interior of the bellows 23 and to the inner or left-hand face of the end plate 30, as shown in Fig. 2, so that the rod 33 is held at the position where resistance to further advancing movement of the accelerator pedal is effective by virtue of the vacuum applied to the outer face of the end plate 30. For admitting vacuum to the interior of the bellows 23, a tubular valve member 120 (see Figs. 2 and 9) is slidably mounted in a bore formed in the inner end wall 19 of the housing 20. The bore in which the valve member 120 is mounted has a first enlargement 121 and a still larger second enlargement 122. The first enlargement 121 is connected to the cavity 35 by a passage 123 so that vacuum will be admitted to the first enlarged portion 121 of the bore for the valve 120. The difference in diameter between the two enlargements 121 and 122 provides a shoulder 124, and the valve member 120 is provided with a head 125 adapted to seat against the shoulder 124. When the head 125 is so seated, no vacuum is admitted to the second enlarged portion 122 of the valve bore. When the head 125 is moved away from the shoulder 124, vacuum is admitted to the second enlarged portion 122 and is permitted to pass through a radial passage 126 in the valve head 125 and thence through the tubular valve member 120 to the interior of the reduced portion 24 of the housing 20 at the left end thereof. Thus, when the valve head 125 is unseated from the shoulder 124, vacuum will be applied to the interior of the bellows 23 and the end plate 30.

With the structure just described, the vehicle will be maintained at the speed for which the device is set. Should the vehicle encounter increased road resistance as in going uphill, the speed of the vehicle will fall slightly below the set speed. The resistance to advancing movement of the accelerator pedal no longer occurs and the vacuum applied to the interior of the bellows advances the accelerator pedal until the resistance again occurs to prevent further advancing movement. Should the road resistance decrease as in going downhill, the vehicle speed will be held at the set value since the vacuum applied to both the interior and exterior of the bellows counterbalance the forces acting on the bellows and the spring 51 that normally tends to move the accelerator pedal toward idle position will cause the pedal to recede to the point where the resistance due to the application of vacuum to the exterior of the bellows no longer occurs.

The valve 120 is limited in its movement by a plug 127 mounted in the end wall 19 of the housing 20. The plug 127 has a central bore 130 communicating with the interior of the cover 76 so that the bore 130 is at atmospheric pressure. The plug 127 has a central cylindrical projection 131 at its inner end adapted to be engaged by the head 125 of the valve member 120. When the head 125 is unseated from the shoulder 124, the head 125 engages against the projection 131 to close the bore 130 so that air at atmospheric pressure cannot be admitted to the interior of the bellows when vacuum is being applied thereto. When the valve member 120 is shifted to seat its head 125 on the shoulder 124 to shut off the application of vacuum to the interior of the bellows, the head 125 moves away from the projection 131 on the plug 127 so that the bore 130 in the plug communicates with the second enlarged portion 122 and the latter is maintained at atmospheric pressure. Air at atmospheric pressure may then enter the interior of the bellows through the passages in the valve head 125 and the valve member 120. Air at atmospheric pressure is usually sufficient to shift the valve member 120 to seat the head 125 against the shoulder 124, but to insure such movement of the valve member, a spring 132 surrounds the projection 131 and bears against the head 125.

The valve 120 is adapted to be actuated by means which is manually controlled, for applying vacuum to the interior of the bellows 23 and the end plate 30. In the preferred construction, the vacuum cannot be applied to the interior of the bellows and end plate through the valve 120 until the vehicle has been brought up to the speed at which it is to be held. The means for shifting the valve 120 to apply vacuum to the interior of the bellows and end plate utilizes electrically energized magnet means which is initially energized through a manual control, and is thereafter maintained in an energized condition automatically. Deenergization of the electromagnetic means is effected through depression of either the accelerator pedal or the brake pedal, as mentioned above.

The means for actuating the valve 120 is shown in Figs. 2, 4, 5, 6 and 9 and comprises a lever 140 pivotally mounted in the reduced portion 24 of the housing and engaging the inner end of the valve member 120. To permit the vacuum to pass freely through the valve member 120 when the lever 140 is in engagement therewith, the inner end of the vehicle member 120 is provided with a plurality of radial notches 141. The lever 140 is carried on an insulating plate 142 of somewhat shield shape (see Fig. 5), which in turn is mounted on an inverted Y-shaped spring, the arms of which are shown at 143 and the stem of which is shown at 144. The ends of the arms 143 are mounted on studs 145 (see Fig. 6) on the support 25 as by screws 146. The lever 140 is thus swingably supported by the spring.

To actuate the lever 140, a pair of electromagnets 147 are mounted on and extend through the support 25. The electromagnets 147 are secured to a strip 150 as by screws 151 (see Fig. 4) and the strip 150 at its ends is secured to the support 25 as by screws 152. When the electromagnets 147 are energized, the lower end of the lever 140, as viewed in Fig. 9, is drawn to the magnets, thus swinging the upper end of the lever to the left, in Fig. 9, to force the valve 120 to the left, thus applying vacuum to the interior of the bellows as heretofore described.

The control circuit for energizing the electromagnets 147 includes a manually operable switch to be operated by the driver when desired and receives current from the battery of the vehicle. The battery, indicated at 153 in the wiring diagram of Fig. 10, is as usual grounded at one side to the frame of the vehicle. The other side of the battery is connected to one of the electromagnets 147. The two electromagnets are connected in series and the other electromagnet is connected to a post 154 (see Figs. 5, 6 and 7) mounted on the insulating support 25 in the space between the latter and the end wall 19 of the housing. The post 154 supports a contact member 155 intermediate the ends of the latter. The contact member 155 at one end engages a screw 156 mounted in an insulating bushing in the end wall 19. The head of the screw 156 is located on the exterior of the wall 19 and is enclosed in a small insulated casing 157 mounted on the wall 19.

Energization of the electromagnets 147 cannot be effected until the driver brings the vehicle up to the speed at which resistance to advancing movement of the accelerator pedal occurs. To this end, the control circuit also includes a switch adapted to be closed when vacuum is applied to the exterior of the bellows 23 and the end plate 30 to provide the resistance. In the present instance, this switch is in the form of a metal diaphragm 160 (see Fig. 7) positioned in the casing 157 and adapted to be drawn into engagement with the head of the screw 156. To effect such engagement, the interior of the casing 157 is connected to the interior of the housing 22 by a passage 161 formed in the end wall 19. Thus, when vacuum is applied to the exterior of the bellows 23, it is also applied to the diaphragm 160 to draw the latter into engagement with the screw 156. The casing 157 is provided with a small hole 162 to admit air to the side of the diaphragm opposite to that to which vacuum is applied to cause the diaphragm to flex freely.

The diaphragm 160 extends to the exterior of the casing 157 and is connected to a binding post 163. The latter is connected by a wire 164 to a manually operable switch located in a position to be readily operated by the driver of the vehicle. In the present instance, the wire 164 is shown as being connected to a push-button switch 165 (see Figs. 1 and 10) mounted on the steering column 166 of the vehicle, the switch 165 being grounded through the steering column. Thus, when the vehicle attains the speed at which resistance to advancing movement of the accelerator pedal occurs and the driver then presses the push-button switch 165, the electromagnets 147 will be energized to shift the valve 120 and apply vacuum to the interior of the bellows 23 as well as to the exterior thereof.

The control circuit for the electromagnets 147 also includes means for maintaining them energized after being initially energized by closure of the push-button switch 165, so that the driver does not need to hold the push-button switch closed. For such purpose, the contact member 155 at its end opposite to that engaging the screw 156 is provided with a contact 167 engageable with a contact 170 carried on the stem 144 of the Y-shaped spring. When the electromagnets 147 are initially energized by the push-button switch 165, the lever 140 is swung, thus flexing the Y-shaped spring and shifting the contact 170 into engagement with the contact 167.

The control circuit further includes a switch which is closed when the driver removes pressure from the accelerator pedal. Thus, one of the screws 146 by which the Y-shaped spring is secured to the support 25 is connected to a wire 171 loosely coiled about the tubular rod 33 (see Figs. 2 and 9) within the bellows 23. The wire 171 is, in turn, connected to a collar 172 mounted on an insulating ring 173 surrounding the rod 33 and abutting the bridge member 53. The collar 172 has a radially extending arm 174 secured at its outer end to the outer end of spring member 57, and the latter carries a contact 175. The contact 175 normally engages a contact 176 carried on the end plate 30 to ground the circuit through the end plate 30 in the rod 33.

Thus when the control circuit is closed to energize the electromagnets 147 by bringing the vehicle up to the speed at which resistance occurs and by closing the push-button switch 165, the electromagnets 147 will remain energized since the contacts 167 and 170 are thereby engaged and, on removal of pressure on the accelerator pedal, the contacts 175 and 176 are engaged. The push-button switch 165 may then be permitted to open but vacuum continues to be applied to the interior of the bellows 23. When vacuum is thus applied, the end plate 30 is drawn to the left, as shown in Fig. 2, to abut the snap ring 52 and the rod 33 is correspondingly shifted to hold the accelerator pedal at the position at which resistance to further advancing movement occurs. The driver may then remove his foot from the accelerator pedal but the vehicle will continue to be driven at the speed for which the governor spring 86 is set.

When the control circuit is set to hold the vehicle at a desired driving speed with the driver's foot removed from the accelerator pedal, it is of course desirable from the safety standpoint to be able to disable the holding means quickly so that the vehicle may be returned to normal control by the driver. Should the need arise to disable the holding means because of an emergency, the driver will want to do either of two things. He may want to quickly accelerate the vehicle or he may want to apply the brake. The control circuit in the present instance is such that, when the driver does either of these two things, the circuit will be opened and the holding means thus disabled.

If the driver wishes to accelerate the vehicle quickly, pressure on the accelerator pedal will shift the rod 33 to the left, as viewed in Fig. 2. Such movement of the rod 33 shifts the snap ring 52 into engagement with the spring member 57 and the latter in turn flexes to move the contact 175 out of engagement with the contact 176. The circuit for the electromagnets 147 is thus opened and the lever 140 is no longer held by the electromagnets. The Y-shaped spring 143 then shifts the lever 140, and atmospheric pressure against the head 125 of the valve member 120 together with the force of the spring 132 shifts the valve member 120 so that vacuum is no longer applied to the interior of the bellows 23. The holding means is thus disabled so that the accelerator pedal is returned to normal operation by the driver.

While the holding means may be disabled in this manner by pressure on the accelerator pedal, resistance to advancing movement of the pedal will occur whenever the vehicle exceeds the predetermined speed for which the governor spring 86 is set. Since the holding means maintains the vehicle at this predetermined speed, the driver in pressing on the accelerator pedal to disable the holding means encounters the resistance. The magnitude of the resistance varies with variations in vacuum in the intake manifold. To limit the resistance to movement of the accelerator pedal, the telescopic joint 39 is yieldable. Thus, the link 41 is provided with an enlarged head 180 (see Fig. 2) positioned within a sleeve 181, the latter having an inwardly turned flange 182 at one end fitting snugly around the link 41 beyond the head 180. Within the sleeve 181 is a compression spring 183 bearing at one end against the head 180 and at its other end against a stud 184 threaded into the sleeve 181 the stud 184 engaging the bell crank 42. Thus, when the accelerator pedal is advanced and there is a high vacuum in the intake manifold, creating a high resistance, the spring 183 will yield, permitting movement of the accelerator pedal relative to the rod 33. The stud 184 may be adjusted relative to the sleeve 181 by its threaded connection therewith, to vary the loading of the spring 183 and thus vary the pressure required to advance the accelerator pedal when the resistance is effective.

As mentioned above, the holding means may also be disabled when the driver applies the brakes. In most emergencies that occur, application of the brakes is the thing that the driver is most likely to do. To this end, a switch 185 (see Figs. 1 and 10) is interposed in the control circuit between the battery 153 and the electromagnets 147. The switch 185 is located adjacent the brake pedal, shown at 186, and is closed when the brake pedal is in its "off" position. However, the switch 185 is arranged to be opened by slight movement of the brake pedal as the brakes are applied. Thus, on opening of the switch 185, the electromagnets 147 are deenergized and the holding means is disabled as heretofore described.

The vacuum in the intake manifold of the engine of a vehicle varies to a substantial extent under different operating conditions of the engine. Thus, when the engine is accelerating, the vacuum may be quite low. When the load on the engine decreases, the vacuum increases Because of this fact, the resistance to advancing movement of the accelerator pedal will vary. To avoid such variation, a check valve is provided, which closes to maintain a vacuum in the device when the vacuum in the intake manifold decreases.

To this end, a check valve, indicated generally at 190 (see Fig. 9), is mounted in the valve chamber 66 in the end wall 19 of the housing. The valve 190 is of the spool type and comprises a reduced central portion 191 having an enlarged portion 192 at one end slidable in the chamber 66. At its other end is an enlarged head 193 located in the enlarged portion 67 of the valve chamber and of larger diameter than enlarged portion 192. When the engine is operating and the vacuum is reasonably high, the valve 190 is drawn to the left to the position shown in Fig. 9. Communication is thus established around the reduced central portion 191 of the valve between the passage 71 and the passage 65 for applying vacuum to the bellows. A light spring 194 bears against the head 193 of the valve so that the valve will not open until the vacuum is substantial. Should the vacuum in the intake manifold of the engine materially decrease when the vacuum is being applied to the bellows, the spring 194 immediately shifts the valve to the right until the head 193 engages the shoulder 70 in the valve chamber to close the valve. The vacuum within the device will thus remain substantially at the value it had before the valve closed.

The device disclosed herein can also be completely disabled by the driver so that the vehicle can be operated in the normal manner. For this purpose, the check valve 190 is arranged to be manually shifted to closed position to prevent application of vacuum to the device. Thus, the enlarged portion 67 of the valve chamber is threaded, as at 195, at its outer end to receive an elongated plug 196 (see Figs. 2 and 9). The plug 196 also extends through a tubular bracket 197 located within the cover 76, which supports the pivot 114 for the lever 113. The bracket 197 is rigidly secured to the end wall 19 of the housing by the plug 196 and a nut 200 threaded on the outer end of the plug 196.

To manually shift the valve 190, a push rod 201 is slidably mounted in the plug 196. The push rod 201 at its inner end engages the head 193 of the valve 190 and at its outer end has a head 202 slidable in an enlarged bore 203 in the plug 196. Surrounding the push rod 201 in the bore 203 is a coiled spring 204 bearing against the head 202 and thus tending to shift the push rod 201 to permit the valve 190 to open. To push the valve closed, the head 202 is engaged by an extension 205 on the end of the lever 113 by which the pressure of the governor spring 86 is adjusted. Thus, by manually adjusting the Bowden wire 115 to the position where the spring 86 exerts its minimum pressure on the governor weights, the reaction force of the governor spring 86 on the lever 113 forces the push rod 201 inwardly to close the valve 190. With the valve 190 closed, no vacuum can be applied to the bellows 23 either for advancing the accelerator pedal or for resisting such advancing movement. The device can thus be manually disabled when desired by the driver so that the vehicle may be operated in the ordinary manner.

In the modified form of the device partially illustrated in Figs. 11 and 12, the switch for disabling the holding means by pressure on the accelerator pedal is eliminated and the structure of the end wall of the bellows is simplified. Thus, the holding means, when functioning, can be disabled only by actuation of the brake pedal. To this end, the Y-shaped spring located between the support 25 and the end wall 19 of the housing is grounded to the housing, rather than being connected to an accelerator-actuated switch. Thus, one of the screws 146 which secures the Y-shaped spring in place has a wire 206 secured thereto, the wire 206 being shown as attached to end wall 19 by a screw 207 for grounding.

In this form of the device, since no switch on the end wall of the bellows 23 is required, the construction of the end wall and its mounting on the rod 33 is simplified. In this instance, the end wall comprises a pair of circular plates 210 mounted on the rod 33 and clamping the end of the bellows 23 between them at their periphery. The plates are secured together by a plurality of screws 211. To secure the plates 210 to the rod 33, a snap ring 212 is mounted in a groove in the rod between the two plates. The plates are thus constrained to move with the rod 33.

From the foregoing description, it will become apparent that I have provided a novel device for establishing a resistance to advancing movement of the accelerator pedal when the vehicle reaches a predetermined speed. The speed at which such resistance occurs may be adjusted by the driver of the vehicle. The device also provides a novel means for holding the accelerator pedal at such position as to effect such predetermined speed. In the form of the device shown in Figs. 1 to 10, such holding means may be disabled either by pressure on the accelerator pedal or by pressure on the brake pedal, while in the form shown in Figs. 11 and 12, the holding means may be disabled only by pressure on the brake pedal. The device also includes means for preventing sudden decreases in vacuum in the intake manifold of the engine from affecting the operation of the device as well as means for manually disabling the device, when desired by the driver, so that the vehicle may be operated as though the device were not present.

I claim:

1. A speed control device for an automotive vehicle having a driver operated throttle control member, said device comprising a housing, a bellows mounted in said housing and having one end secured to said housing and having a movable end wall at its other end, an element for connecting said end wall to said control member for movement therewith, a governor-controlled valve dependent upon movement of said element for applying vacuum to the exterior of said bellows at a predetermined vehicle speed, and a second valve for applying vacuum to the interior of said bellows for holding said element in a position where said governor-controlled valve is on the point of applying vacuum to the exterior of said bellows whereby said control member is held in position to operate said vehicle at said predetermined speed.

2. A speed control device for an automotive vehicle having a driver operated throttle control member, said device comprising a housing, flexible pressure responsive means mounted in said housing and having one portion secured to said housing and having another portion movable when pressure is applied thereto, an element for connecting said movable portion to said control member for movement therewith, a valve for applying vacuum to one side of said flexible means to advance said control member, means for applying vacuum to the other side of said flexible means at a predetermined vehicle speed to oppose advancing movement of said control member to hold said control member in position to operate said vehicle at said predetermined speed, and manually controlled means for operating said valve.

3. A speed control device for an automotive vehicle having a driver operated throttle control member, said device comprising a housing, an element adapted to be connected to said control member and extending into said housing, a flexible pressure responsive means mounted on said housing and secured thereto and having a movable portion secured to said element for movement therewith, a valve for applying vacuum to said flexible means for advancing said control member, and means for oppositely applying vacuum directly to said flexible means at a predetermined vehicle speed to oppose advancing movement of said control member to hold said control member in position to operate said vehicle at said predetermined speed.

4. A speed control device for an automotive vehicle having a driver operated throttle control valve, said device comprising a housing, a bellows mounted in said housing and having at one end a movable end wall, an element adapted to be connected to said control member and movably extending into one end of said housing and connected to said end wall, the other end of said bellows being secured to said housing, a valve mounted in the other end of said housing and communicating with the interior of said bellows for applying vacuum to said bellows to collapse said bellows and thereby advance said control member, and means for applying vacuum to the exterior of said bellows at a predetermined vehicle speed to oppose the advancing movement of said control member to hold said control member in position to operate said vehicle at said predetermined speed.

5. A speed control device for an automotive vehicle having a driver operated throttle control member, said device comprising a housing, a bellows mounted in said housing and having at one end a movable end wall, a tubular element adapted at one end to be connected to said control member and movably extending through both ends of the housing and connected intermediate its ends to said end wall, the other end of said bellows being rigidly secured to the housing adjacent one end thereof, a valve mounted in said one end of the housing for applying vacuum to the interior of said bellows to draw said end wall toward said one end of the housing and thereby advance said control member, said tubular element having a transverse opening from its interior to said housing adjacent the outer side of said end wall, and a governor-controlled valve member extending through said one end of the housing and into said tubular element and operable at a predetermined vehicle speed to apply vacuum through said transverse opening to the exterior of said bellows to oppose advancing movement of said control member to hold said control member in position to operate said vehicle at said predetermined speed.

6. A speed control device for an automotive vehicle having a driver operated throttle control member, said device comprising a housing, a bellows mounted in said housing and having one end secured to said housing adjacent one end thereof, said bellows having a movable end wall at its other end, a tubular element adapted to be connected to said control member and extending through said housing and connected to said end wall, said element having a transverse opening at the outer side of said end wall, a manually controlled valve mounted in said one end of the housing for applying vacuum to the interior of said bellows for advancing said control member, and a governor operated valve member mounted in said one end of the housing and extending into said element and cooperating with said transverse opening to apply vacuum to the exterior of said bellows at a predetermined vehicle speed to oppose advancing movement of said control member, said one end of the housing having a passage adapted to be connected to a source of vacuum and communicating with the interior of said element and with said manually operable valve.

7. A speed control device for an automotive vehicle having a throttle control member adapted to be advanced by the driver to increase the speed of the vehicle and having a spring to return said member toward idling position, said device comprising an element adapted to be connected to said control member, bellows means having a movable portion mounted on said element, an abutment on said element engageable by said movable portion when the latter is moved in a direction to advance said control member, a valve for applying vacuum to said bellows to move said movable portion in said direction to advance said control member, and means for oppositely applying vacuum to said bellows means at a predetermined vehicle speed to oppose advancing movement of said movable portion and tending to move said movable portion in a return direction when the vehicle speed exceedss said predetermined speed, said spring being adapted to return said element to hold said abutment engaged with said movable portion when the movable portion is moved in a return direction.

8. A speed control device for an automotive vehicle having a driver operated throttle control member, said device comprising a housing having spaced end walls, a tubular element adapted to be connected to said control member and extending through one housing end wall and into the other end wall, bellows means within said housing and having a movable portion secured to said element for movement therewith, a manually controlled valve mounted in said other end wall for applying vacuum to said bellows means for advancing said control member, and a governor-operated valve member extending through said other end wall and into said element for oppositely applying vacuum to said bellows means through said element at a predetermined vehicle speed to oppose advancing movement of said control member, said other end wall having a passage adapted to be connected to a source of vacuum and communicating with the interior of said element and with said manually controlled valve.

9. A speed control device for an automotive vehicle having a driver operated throttle control member, said device comprising a housing having an end wall, an element adapted to be connected to said control member extending into said housing, bellows means within said housing and closed by said end wall and having a movable portion at one end secured to said element for movement therewith, a support located in said housing within said bellows adjacent said end wall and securing the other end of said bellows means to said housing, a valve mounted in said end wall for selectively connecting the interior of said bellows means with the atmosphere and with a source of vacuum, and means mounted on said support for actuating said valve.

10. A speed control device for an automotive vehicle having a driver operated throttle control member, said device comprising a housing having an end wall, an element adapted to be connected to said control member extending into said housing, bellows means within said housing and closed by said end wall and having a movable portion at one end secured to said element for movement therewith, a support located in said housing within said bellows adjacent said end wall and securing the other end of said bellows means to said housing, said end wall having a pair of passages, one extending to the exterior of said wall for connection to the atmosphere and the other adapted to be connected to a source of vacuum, and a valve mounted in said end wall for selectively connecting said passages with the interior of said bellows.

11. A speed control device for an automotive vehicle having a driver operated throttle control member, said device comprising a housing having an end wall, an element adapted to be connected to said control member extending into said housing, bellows means within said housing having a movable portion at one end secured to said element for movement therewith, a support located in said housing adjacent said end wall and securing the other end of said bellows means to said housing, said end wall having a chamber and a pair of passages extending from the respective ends of said chamber, one of said passages extending to the exterior of said housing for connection to the atmosphere and the other adapted to be connected to a source of vacuum, and a tubular valve mounted in said end wall and having a passage extending from said chamber to the interior of said housing for communicating with the interior of said bellows, said valve having a head portion located in said chamber and shiftable therein to close one of said passages and open the other and vice versa.

12. A speed control device for an automotive vehicle having a driver operated throttle control member, said device comprising a housing having an end wall, an element adapted to be connected to said control member extending into said housing, bellows means within said housing having a movable portion at one end secured to said element for movement therewith, a support located in said housing adjacent said end wall and securing the other end of said bellows means to said housing, said end wall having a chamber and a pair of passages extending from the respective ends of said chamber, one of said passages extending to the exterior of said housing for connection to the atmosphere and the other adapted to be connected to a source of vacuum, and a tubular valve mounted in said end wall and having a passage extending to the interior of said housing for communicating with the interior of said bellows, said valve having a head portion located in said chamber and provided with radial openings for communication between said chamber and the interior of said valve, said valve being shiftable to move said head into closing relation with one of said pair of passages and opening relation to the other of said pair of passages and vice versa.

13. A speed control device for an automotive vehicle having a driver operated throttle control member, said device comprising a housing having an end wall, an element adapted to be connected to said control member extending into said housing, bellows means within said housing having a movable portion at one end secured to said element for movement therewith, a support located in said housing adjacent said end wall and securing the other end of said bellows means to said housing, a valve mounted in said end wall for selectively connecting the interior of said bellows means with the atmosphere and with a source of vacuum, a lever mounted in said housing for actuating said valve, and means mounted on said support for moving said lever.

14. A speed control device for an automotive vehicle having a driver operated throttle control member, said device comprising a housing, an element adapted to be connected to said control member extending into said housing, pressure responsive means mounted in said housing and connected to said element for movement therewith, means providing a passage adapted to be connected with the manifold of the engine of the vehicle and communicating with the interior of said housing to apply vacuum from the manifold to said pressure responsive means, a check valve in said passage to close said passage and maintain the vacuum in said housing when there is a reduction of vacuum in the manifold, and manually operable means for closing said check valve to render said pressure responsive means inoperative.

15. A speed control device for an automotive vehicle having a driver operated throttle control member, said device comprising a housing, an element adapted to be connected to said control member extending into said housing, pressure responsive means mounted in said housing and connected to said element for movement therewith, means providing a passage adapted to be connected with the manifold of the engine of the vehicle, a valve for connecting said passage with the interior of said housing to apply vacuum from the manifold to said pressure responsive means, a check valve in said passage responsive to a reduction in vacuum in the manifold to close said passage and maintain the vacuum in said housing, and manually operable means for closing said check valve to render said pressure responsive means inoperative.

16. A speed control device for an automotive vehicle having a driver operated throttle control member, said device comprising a housing, an element adapted to be connected to said control member extending into said housing, pressure responsive means mounted in said housing and connected to said element for movement therewith, means providing a passage adapted to be connected to the manifold of the engine of the vehicle, manually controlled valve means connected to said passage for applying vacuum from the manifold to said pressure responsive means to advance said throttle control member, governor operated valve means connected to said passage for applying vacuum from the manifold to said pressure responsive means at a predetermined vehicle speed to resist the advancing movement of said throttle control member, and a check valve in said passage responsive to a reduction in vacuum in the manifold to close said passage and maintain vacuum applied to said pressure responsive means by said manually controlled valve means and said governor operated valve means.

17. A speed control device for an automotive vehicle having a driver operated throttle control member, said device comprising a housing, an element adapted to be connected to said control member extending into said housing, pressure responsive means mounted in said housing and connected to said element for movement therewith, means providing a passage adapted to be connected to the manifold of the engine of the vehicle, manually controlled valve means connected to said passage for applying vacuum from the manifold to said pressure responsive means to advance said throttle control member, governor operated valve means connected to said passage for applying vacuum from the manifold to said pressure responsive means at a predetermined vehicle speed to resist the advancing movement of said throttle control member, a cutoff valve in said passage for cutting off the vacuum to said manually controlled valve means and to said governor operated valve means to render the device inoperative, and adjustable means for varying the vehicle speed at which said governor operated valve means applies vacuum to said pressure responsive means to resist advancing movement of said throttle control member, said adjustable means having a connection with said cutoff valve to render the device inoperative when said adjustable means is adjusted below a predetermined minimum vehicle speed.

18. A speed control device for an automotive vehicle having a driver operated throttle control member, said device comprising a housing, an element adapted to be connected to said control member extending into said housing, pressure responsive means mounted in said housing and connected to said element for movement therewith, means providing a passage adapted to be connected to the manifold of the engine of the vehicle, manually controlled valve means connected to said passage for applying vacuum from the manifold to said pressure responsive means to advance said throttle control member, governor operated valve means connected to said passage for applying vacuum from the manifold to said pressure responsive means to resist the advancing movement of said throttle control member, a governor for operating said governor operated valve means including a governor spring, lever means for adjusting said spring to vary the vehicle speed at which said governor operated valve means applies vacuum to said pressure responsive means to resist advancing movement of said throttle control member, and a cutoff valve in said passage for cutting off the vacuum to said manually controlled valve means and to said governor operated valve means to render the device inoperative, said lever means being operatively connected to said cutoff valve to cut off the vacuum and render the device inoperative when said lever means is adjusted below a predetermined minimum vehicle speed.

19. A speed control device for an automotive vehicle having a driver operated throttle control member, said device comprising a housing, an element adapted to be connected to said control member extending into said housing, pressure responsive means mounted in said housing and connected to said element for movement therewith, means providing a passage adapted to be connected to the manifold of the engine of the vehicle and communicating with the interior of said housing to apply vacuum from the manifold to said pressure responsive means, cutoff valve means in said passage to close said passage, and manually operable means for closing said cutoff valve means to render the device inoperable, said cutoff valve means also being movable to a closed position in response to a reduction in vacuum in the manifold to maintain the vacuum in said housing when there is a reduction of vacuum in the manifold.

20. A speed control device for an automotive vehicle having a driver operated throttle control member, said device comprising a housing, an element adapted to be connected to said control member extending into said housing, pressure responsive means mounted in said housing and connected to said element for movement therewith, means providing a passage adapted to be connected to the manifold of the engine of the vehicle, manually controlled valve means connected to said passage for applying vacuum from the manifold to said pressure responsive means to advance said throttle control member, governor operated valve means connected to said passage for applying vacuum from the manifold to said pressure responsive means to resist the advancing movement of said throttle control member, a governor for operating said governor operated valve means including a governor spring, lever means for adjusting said spring to vary the vehicle speed at which said governor operated valve means applies vacuum to said pressure responsive means to resist advancing movement of said throttle control member, and a cutoff valve in said passage movable to a closed position to prevent communication from the manifold to said manually controlled valve means and said governor operated valve means, said lever means being operable to close said cutoff valve when said lever means is adjusted below a predetermined vehicle speed, said cutoff valve also being movable to a closed position in response to a reduction in vacuum in the manifold to maintain the vacuum in said housing when there is a reduction of vacuum in the manifold.

21. In an automotive vehicle having a driver operated throttle control member, fluid pressure means for holding said throttle control member in position for operating the vehicle at a predetermined speed, manually controlled valve means for controlling the application of fluid pressure to said fluid pressure means in a direction tending to advance said throttle control member, governor operated valve means for applying fluid pressure to said fluid pressure means in a direction to oppose advancing movement of said throttle control member, manually operable means to control shifting of said manually controlled valve means to apply fluid pressure to said fluid pressure means, and means for rendering said manually operable means effective only when said governor operated valve applies fluid pressure to said fluid pressure means.

22. In an automotive vehicle having a driver operated throttle member, vacuum operated means for holding said throttle control member in a position for operating the vehicle at a predetermined speed, governor operated means operable at said predetermined speed for applying vacuum to said vacuum operated means in a direction to resist advancing movement of said throttle control member, valve means adapted to be opened for applying vacuum to said vacuum operated means in the opposite direction to hold said vacuum operated means in the position where said governor operated means applies vacuum thereto, manually controlled means for shifting said valve means to its open position, and means responsive to the application of vacuum in the first-mentioned direction for rendering said manually controlled means operable.

23. In an automotive vehicle having a driver operated throttle control member, vacuum operated means for holding said throttle control member in a position for operating the vehicle at a predetermined speed, governor operated means operable at said predetermined speed for applying vacuum to said vacuum operated means in a direction to resist advancing movement of said throttle control member, valve means adapted to be opened for applying vacuum to said vacuum operated means in the opposite direction to hold said vacuum operated means in the position where said governor operated means applies vacuum thereto, actuating means for shifting said valve means to and holding in its open position, manual control means for effecting operation of said actuating means to shift said valve means and means responsive to the application of vacuum in the first-mentioned direction for rendering said manual control means operable.

24. A speed control device for an automotive vehicle having a driver operated throttle control member, said device comprising a housing, an element adapted to be connected to said control member and extending into said housing, bellows means within said housing having one end secured to said element for movement therewith and the other end secured to said housing, a valve mounted in the wall of said housing for selectively connecting the interior of said bellows means with the atmosphere and with a source of vacuum, an actuating member mounted in said housing for shifting said valve, and magnetic coil means mounted in said housing within said bellows and adapted to operate said actuating member to shift said valve.

25. A speed control device for an automotive vehicle having a driver operated throttle control member, said device comprising a housing, an element adapted to be connected to said control member and extending into said housing, bellows means within said housing having one end secured to said element for movement therewith, a support mounted in said housing in spaced relation to one end thereof and securing the other end of the bellows means to said housing, a valve mounted in the wall of said housing and opening into the space between said support and said one end of the housing for selectively connecting the interior of said bellows means with the atmosphere and with a source of vacuum, a lever pivotally supported on said support in said space for shifting said valve, and magnetic coil means mounted on said support for actuating said lever to shift said valve.

26. A speed control device for an automotive vehicle having a driver operated throttle control member, said device comprising a housing, an element adapted to be connected to said control member and extending into said housing, bellows means within said housing having one end secured to said element for movement therewith and the other end secured to said housing, a valve mounted in the wall of said housing for selectively connecting the interior of said bellows means with the atmosphere and with a source of vacuum, an actuating member mounted in said housing for shifting said valve, and magnetic coil means mounted in said housing within said bellows and adapted to operate said actuating member to shift said valve, and a circuit for energizing said magnetic coil means including a manually operable switch for establishing said circuit, and means movable with said actuating member when shifting said valve to connect the interior of said bellows means with the source of vacuum to maintain said circuit.

27. A speed control device for an automotive vehicle having a driver operated throttle control member, said device comprising a housing, an element adapted to be connected to said control member and extending into said housing, bellows means within said housing having one end secured to said element for movement therewith, a support mounted in said housing in spaced relation to one end thereof and securing the other end of the bellows means to said housing, a valve mounted in the wall of said housing and opening into the space between said support and said one end of the housing for selectively connecting the interior of said bellows means with the atmosphere and with a source of vacuum, a lever for shifting said valve to connect the interior of the bellows with the source of vacuum, a spring mounted on said support and pivotally supporting said lever and tending to prevent valve shifting movement of said lever, magnetic coil means mounted on said support for moving said lever against said spring to shift said valve, and a circuit for energizing said magnetic coil means including a manually operable switch for establishing said circuit, and contact means carried by said spring for maintaining the circuit when said lever is moved by said magnetic coil means.

28. In an automotive vehicle having a driver operated throttle control member, fluid pressure means for holding said throttle control member in a position for operating the vehicle at a predetermined speed, valve means for applying fluid pressure to said fluid pressure means in a direction tending to advance said throttle control member, governor operated means operable at a predetermined speed for applying fluid pressure to said fluid pressure means in a direction to resist advancing movement of said throttle control member, magnetic coil means for rendering said valve means operable to apply fluid pressure to said fluid pressure means, and a circuit for energizing said magnetic coil means including a manually operable switch and a switch closable in response to the application of fluid pressure to said fluid pressure means by said governor operated means.

29. A speed control device for an automotive vehicle having a driver operated throttle control member, said device comprising a housing, an element adapted to be connected to said control member and extending into said housing, bellows means within said housing having one end secured to said element for movement therewith and the other end secured to said housing, a valve mounted in the wall of said housing for selectively connecting the interior of said bellows means with the atmosphere and with a source of vacuum, governor operated means operable at a predetermined vehicle speed for connecting the interior of said housing exteriorly of said bellows means with said source of vacuum, magnetic coil means for shifting said valve means to apply vacuum to the interior of said bellows means, means providing a chamber adjacent said housing and having a passage connecting said chamber with the interior of said housing exteriorly of said bellows means, a diaphragm in said chamber movable in response to the presence of vacuum in said housing, and a circuit for energizing said magnetic coil means including a switch closable by movement of said diaphragm.

30. In an automotive vehicle having a driver operated throttel control member, fluid pressure means for holding said throttle control member in a position for operating the vehicle at a predetermined speed, valve means for applying fluid pressure to said fluid pressure means in a direction tending to advance said throttle control member, governor operated means operable at a predetermined speed for applying fluid pressure to said fluid pressure means in a direction to resist advancing movement of said throttle control member, magnetic coil means for rendering said valve means operable to apply fluid pressure to said fluid pressure means, a circuit for initially energizing said magnetic coil means, and a circuit for maintaining energization of said magnetic coil means including a switch comprising a first contact carried by said fluid pressure means, a bendable arm movable with said fluid pressure means and having a second contact on its free end engageable with said first contact, and a spring mounted on said fluid pressure means and engaging said arm and tending to bend said arm in a direction to engage said contacts, and means responsive to pressure on the throttle control member for flexing said spring to disengage said contacts.

31. In an automotive vehicle having a driver operated throttle control member, a housing, a rod extending into said housing and movable with said throttle control member, a bellows in said housing having a movable end plate mounted on said rod and having limited movement relative thereto, valve means for applying vacuum to the interior of said bellows to advance said throttle control member, magnetic coil means for shifting said valve means, speed responsive means for applying vacuum to the exterior of said bellows to resist advancing movement of said throttle control member, a circuit for energizing said magnetic coil means including a pair of contacts, one being mounted on said end plate, and a spring mounted at one end on said end plate and carrying the other contact on its other end with the spring normally holding said contacts engaged, said rod having an abutment engageable with an intermediate portion of said spring to separate said contacts when the rod is moved relative to said end plate by the driver advancing said throttle control members.

32. In an automotive vehicle having an accelerator pedal, a rod movable with said pedal, a bellows having an end plate mounted on said rod, said rod and said end plate having abutment means permitting a limited range of relative movement therebetween, valve means for applying vacuum to said bellows in a direction tending to advance said pedal, magnetic coil means for shifting said valve means to apply vacuum to said bellows, a circuit for energizing said magnetic coil means including a pair of contacts, one mounted on said end plate, and a leaf spring having one end moutned on said end plate and carrying the other contact at its other end with the spring normally holding said contacts engaged, said spring extending adjacent said abutment means on said rod and being movable thereby when said rod is moved through said limited range by depression of said pedal to separate said contacts and thereby de-energize said magnetic coil means.

33. In an automotive vehicle having an accelerator pedal, a rod movable with said pedal, a bellows having an end plate mounted on said rod, said rod and said end plate having abutment means permitting a limited range of relative movement therebetween, valve means for applying vacuum to said bellows in a direction tending to advance said pedal, magnetic coil means located within said bellows for shifting said valve means to apply vacuum to said bellows, a circuit for energizing said magnetic coil means including a pair of contacts, one mounted on said end plate, and a coiled connector located within said bellows and having one end connected to said magnetic coil means and its other end located adjacent said end plate and connected to the other contact, and a spring mounted on said end plate and carrying said other contact and normally tending to hold said contacts in engagement, said spring being movable by said abutment means when said rod is moved through said limited range by depression of said pedal to separate said contacts and thereby de-energize said magnetic coil means.

34. In an automotive vehicle having an accelerator pedal, a rod movable with said pedal, a bellows having an end plate and a bridge mounted on said end plate within said bellows, said end plate and said bridge being centrally apertured with said rod extending therethrough, a snap ring mounted on said rod between said end plate and said bridge with the space between said bridge and said end plate permitting a limited range of movement between said rod and said end plate, valve means for applying vacuum to said bellows in a direction tending to advance said pedal, magnetic coil means extending within said bellows for shifting said valve means to apply vacuum to said bellows, a circuit for energizing said magnetic coil means including a pair of contacts, one mounted on said end plate, a coiled connector extending around said rod within said bellows and having one end connected to said magnetic coil means, a collar encircling said rod and mounted on and insulated from said bridge, said collar being connected to the other end of said connector and having an arm connected to the other contact, and a spring mounted on said end plate and carrying said other contact and normally tending to hold said contacts in engagement, said spring being movable by said snap ring when said rod is moved through said limited range by depression of said pedal to separate said contacts and thereby de-energize said magnetic coil means.

35. A speed control device for an automotive vehicle having a driver operated control member, a throttle, and a non-yielding linkage therebetween, said device comprising a movable rod, fluid pressure means engaging said rod for resisting movement thereof, valve means operable at a predetermined vehicle speed for applying pressure fluid to said fluid pressure means, and yieldable means carried by said rod and connected to said linkage for connecting said rod to said control member and thereby to said throttle and including a spring adapted to be compressed by movement of said control member in moving said throttle when the resistance of said fluid pressure means exceeds the force of the spring whereby said throttle may be advanced by the driver without overcoming said fluid pressure means.

36. A speed control device for an automotive vehicle having a driver operated control member, a throttle, and a non-yielding linkage therebetween for controlling the engine of the vehicle, said device comprising a movable rod, vacuum operated means adapted to be connected to the intake manifold of the engine and engaging said rod for resisting movement thereof, valve means operable at a predetermined vehicle speed for applying vacuum to said vacuum operated means, and a telescope joint carried by said rod and connected to said linkage for connecting said rod to said control member and thereby to said throttle and including a spring adapted to be compressed by movement of said control member when the vacuum in the intake manifold is sufficient to produce a resistance of said vacuum operated means exceeding the force of the spring, whereby the force required to actuate said throttle through said control member will not exceed that required to compress said spring and said throttle may be advanced by the driver without overcoming said fluid pressure means.

37. A speed control device for an automotive vehicle having a driver-operated throttle control member, said device comprising an element adapted to be connected to said control member for movement therewith, a member movable with said element, and means for applying opposite forces to said movable member tending to move said movable member and hence said element in opposite directions, and mechanism responisve to vehicle speed, said means being connected to said mechanism and to said element and thereby being responsive to the speed of the vehicle and to the movement of said element for applying a force to said movable member in the direction tending to move said control member toward idle position.

(References on following page)

References Cited in the file of this patent

UNITED STATES PATENTS

| | | |
|---|---|---|
| 714,048 | Smith | Nov. 18, 1902 |
| 1,833,908 | Maybach | Dec. 1, 1931 |
| 2,036,619 | Brown et al. | Apr. 7, 1936 |
| 2,264,989 | Lee | Dec. 2, 1941 |
| 2,301,031 | Ferguson | Nov. 3, 1942 |
| 2,318,721 | Siver | May 11, 1943 |
| 2,340,424 | Ott | Feb. 1, 1944 |
| 2,519,859 | Teetor | Aug. 22, 1950 |
| 2,527,177 | Dach | Oct. 24, 1950 |
| 2,714,880 | Riley | Aug. 9, 1955 |